United States Patent
Gao et al.

(10) Patent No.: US 8,238,830 B2
(45) Date of Patent: Aug. 7, 2012

(54) APPARATUS AND METHOD FOR DETECTING FREE ATSE CHANNELS

(75) Inventors: Wen Gao, West Windsor, NJ (US); Hou-Shin Chen, Piscataway, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 506 days.

(21) Appl. No.: 12/449,078

(22) PCT Filed: Jun. 20, 2007

(86) PCT No.: PCT/US2007/014578
§ 371 (c)(1),
(2), (4) Date: Jul. 22, 2009

(87) PCT Pub. No.: WO2008/097253
PCT Pub. Date: Aug. 14, 2008

(65) Prior Publication Data
US 2010/0035550 A1  Feb. 11, 2010

Related U.S. Application Data

(60) Provisional application No. 60/899,055, filed on Feb. 2, 2007.

(51) Int. Cl.
*H04B 1/00* (2006.01)
*H04B 15/00* (2006.01)
(52) U.S. Cl. ...... 455/63.1; 455/47; 455/67.11; 375/254; 375/355
(58) Field of Classification Search ............ 455/47, 455/63.1, 67.11; 375/254, 355, 362, 368
See application file for complete search history.

(56) References Cited

U.S. PATENT DOCUMENTS

| | | | |
|---|---|---|---|
| 5,056,055 A | | 10/1991 | Shinonaga |
| 5,511,099 A | * | 4/1996 | Ko et al. ............... 375/368 |
| 5,859,671 A | | 1/1999 | Kim |
| 6,233,295 B1 | | 5/2001 | Wang |
| 6,363,131 B1 | | 3/2002 | Beidas et al. |
| 6,992,990 B2 | | 1/2006 | Sakusabe |
| 2002/0021685 A1 | | 2/2002 | Sakusabe |
| 2006/0033843 A1 | | 2/2006 | Klopfenstein et al. |
| 2007/0075803 A1 | | 4/2007 | Kemmochi et al. |

FOREIGN PATENT DOCUMENTS

| | | |
|---|---|---|
| EP | 0358581 | 3/1990 |
| JP | 2071639 | 3/1990 |

(Continued)

OTHER PUBLICATIONS

International Search Report, dated Feb. 12, 2008.

*Primary Examiner* — Tuan H Nguyen
(74) *Attorney, Agent, or Firm* — Robert D. Shedd; Joseph J. Opalach

(57) ABSTRACT

A Wireless Regional Area Network (WRAN) receiver comprises a transceiver for communicating with a wireless network over one of a number of channels, and an Advanced Television Systems Committee (ATSC) signal detector for use in forming a supported channel list comprising those ones of the number of channels upon which an ATSC signal was not detected. The ATSC signal detector comprises a matched filter that matches to at least a modulated version of an ATSC field sync signal for detecting the presence of an incumbent ATSC broadcast signal.

12 Claims, 11 Drawing Sheets

FOREIGN PATENT DOCUMENTS

| | | |
|---|---|---|
| JP | 09511118 | 11/1997 |
| JP | 2001522202 | 11/2001 |
| JP | 2002033714 | 1/2002 |
| JP | 2003502919 | 1/2003 |
| JP | 2006049940 | 2/2006 |
| WO | WO03/081827 | 10/2003 |
| WO | WO2005057803 | 6/2005 |

* cited by examiner

*Prior Art*

Table One – TV Channels

| Ch. | Low Edge | Ch. | Low Edge | Ch. | Low Edge |
|---|---|---|---|---|---|
| 2 | 54 | 29 | 560 | 56 | 772 |
| 3 | 60 | 30 | 566 | 57 | 728 |
| 4 | 66 | 31 | 572 | 58 | 734 |
| 5 | 76 | 32 | 578 | 59 | 740 |
| 6 | 82 | 33 | 584 | 60 | 746 |
| 7 | 174 | 34 | 590 | 61 | 752 |
| 8 | 180 | 35 | 596 | 62 | 758 |
| 9 | 186 | 36 | 602 | 63 | 764 |
| 10 | 192 | 37 | 608 | 64 | 770 |
| 11 | 198 | 38 | 614 | 65 | 776 |
| 12 | 204 | 39 | 620 | 66 | 782 |
| 13 | 210 | 40 | 626 | 67 | 788 |
| 14 | 470 | 41 | 632 | 68 | 794 |
| 15 | 476 | 42 | 638 | 69 | 800 |
| 16 | 482 | 43 | 644 | 70 | 806 |
| 17 | 488 | 44 | 650 | 71 | 812 |
| 18 | 494 | 45 | 656 | 72 | 818 |
| 19 | 500 | 46 | 662 | 73 | 824 |
| 20 | 506 | 47 | 668 | 74 | 830 |
| 21 | 512 | 48 | 674 | 75 | 836 |
| 22 | 518 | 49 | 680 | 76 | 842 |
| 23 | 524 | 50 | 686 | 77 | 848 |
| 24 | 530 | 51 | 692 | 78 | 854 |
| 25 | 536 | 52 | 698 | 79 | 860 |
| 26 | 542 | 53 | 704 | 80 | 866 |
| 27 | 548 | 54 | 710 | 81 | 872 |
| 28 | 554 | 55 | 716 | 82 | 878 |
| | | | | 83 | 884 |

FIG. 1

APPARATUS AND METHOD FOR DETECTING FREE ATSE CHANNELS

This application is a National Stage Application and claims the benefit, under 35 U.S.C. §365 of International Application PCT/US2007/014578 filed Jun. 20, 2007, which was published in accordance with PCT Article 21(2) on Aug. 14, 2008 in English, and which claims the benefit of U.S. provisional patent application No. 60/899,055 filed Feb. 2, 2007.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

A Wireless Regional Area Network (WRAN) system is being studied in the IEEE 802.22 standard group. The WRAN system is intended to make use of unused television (TV) broadcast channels in the TV spectrum, on a non-interfering basis, to address, as a primary objective, rural and remote areas and low population density underserved markets with performance levels similar to those of broadband access technologies serving urban and suburban areas. In addition, the WRAN system may also be able to scale to serve denser population areas where spectrum is available. Since one goal of the WRAN system is not to interfere with TV broadcasts, a critical procedure is to robustly and accurately sense the licensed TV signals that exist in the area served by the WRAN (the WRAN area).

In the United States, the TV spectrum currently comprises ATSC (Advanced Television Systems Committee) broadcast signals that co-exist with NTSC (National Television Systems Committee) broadcast signals. The ATSC broadcast signals are also referred to as digital TV (DTV) signals. Currently, NTSC transmission will cease in 2009 and, at that time, the TV spectrum will comprise only ATSC broadcast signals.

Since, as noted above, one goal of the WRAN system is to not interfere with those TV signals that exist in a particular WRAN area, it is important in a WRAN system to be able to detect ATSC broadcasts. One known method to detect an ATSC signal is to look for a small pilot signal that is a part of the ATSC signal. Such a detector is simple and includes a phase lock-loop with a very narrow bandwidth filter for extracting the ATSC pilot signal. In a WRAN system, this method provides an easy way to check if a broadcast channel is currently in use by simply checking if the ATSC detector provides an extracted ATSC pilot signal. Unfortunately, this method may not be accurate, especially in a very low signal-to-noise ratio (SNR) environment. In fact, false detection of an ATSC signal may occur if there is an interfering signal present in the band that has a spectral component in the pilot carrier position.

SUMMARY OF THE INVENTION

In order to improve the accuracy of detecting ATSC broadcast signals in very low signal-to-noise ratio (SNR) environments, segment sync symbols and field sync symbols embedded within an ATSC DTV signal are utilized to improve the detection probability, while reducing the false alarm probability. In particular, and in accordance with the principles of the invention, an apparatus comprises a transceiver for communicating with a wireless network over one of a number of channels, and a detector that matches to a modulated version of a signature signal for detecting the presence of an incumbent signal on one of the channels.

In an illustrative embodiment of the invention, the transceiver is a Wireless Regional Area Network (WRAN) transceiver, the incumbent signal is an ATSC broadcast signal and the signal detector comprises a matched filter that matches to at least a modulated version of an ATSC field sync signal for detecting the presence of an incumbent ATSC broadcast signal.

In view of the above, and as will be apparent from reading the detailed description, other embodiments and features are also possible and fall within the principles of the invention.

BRIEF DESCRIPTION OF THE DRAWINGS

FIG. 1 shows Table One, which lists television (TV) channels;

DETAILED DESCRIPTION

Other than the inventive concept, the elements shown in the figures are well known and will not be described in detail. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternating Lines), SECAM (SEquential Couleur Avec Memoire), ATSC (Advanced Television Systems Committee), and networking, such as IEEE 802.16, 802.11h, etc., is assumed. Further information on ATSC broadcast signals can be found in the following ATSC standards: Digital Television Standard (A/53), Revision C, including Amendment No. 1 and Corrigendum No. 1, Doc. A/53C; and *Recommended Practice: Guide to the Use of the ATSC Digital Television Standard* (A/54). Likewise, other than the inventive concept, transmission concepts such as eight-level vestigial sideband (8-VSB), Quadrature Amplitude Modulation (QAM), orthogonal frequency division multiplexing (OFDM) or coded OFDM (COFDM)), and receiver components such as a radio-frequency (RF) front-end, or receiver section, such as a low noise block, tuners, and demodulators, correlators, leak integrators and squarers is assumed. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

A TV spectrum for the United States is shown in Table One of FIG. 1, which provides a list of TV channels in the very high frequency (VHF) and ultra high frequency (UHF) bands. For each TV channel, the corresponding low edge of the assigned frequency band is shown. For example, TV channel 2 starts at 54 MHz (millions of hertz), TV channel 37 starts at 608 MHz and TV channel 68 starts at 794 MHz, etc. As known in the art, each TV channel, or band, occupies 6 MHz of bandwidth. As such, TV channel 2 covers the frequency spectrum (or range) 54 MHz to 60 MHz, TV channel 37 covers the band from 608 to 614 MHz and TV channel 68 covers the band from 794 MHz to 800 MHz, etc. In the context of this description, a TV broadcast signal is a "wideband" signal. As noted earlier, a WRAN system makes use of unused television (TV) broadcast channels in the TV spectrum. In this regard, the WRAN system performs "channel sensing" to determine which of these TV channels are actually active (or "incumbent") in the WRAN area in order to determine that portion of the TV spectrum that is actually available for use by the WRAN system.

Figure 2:
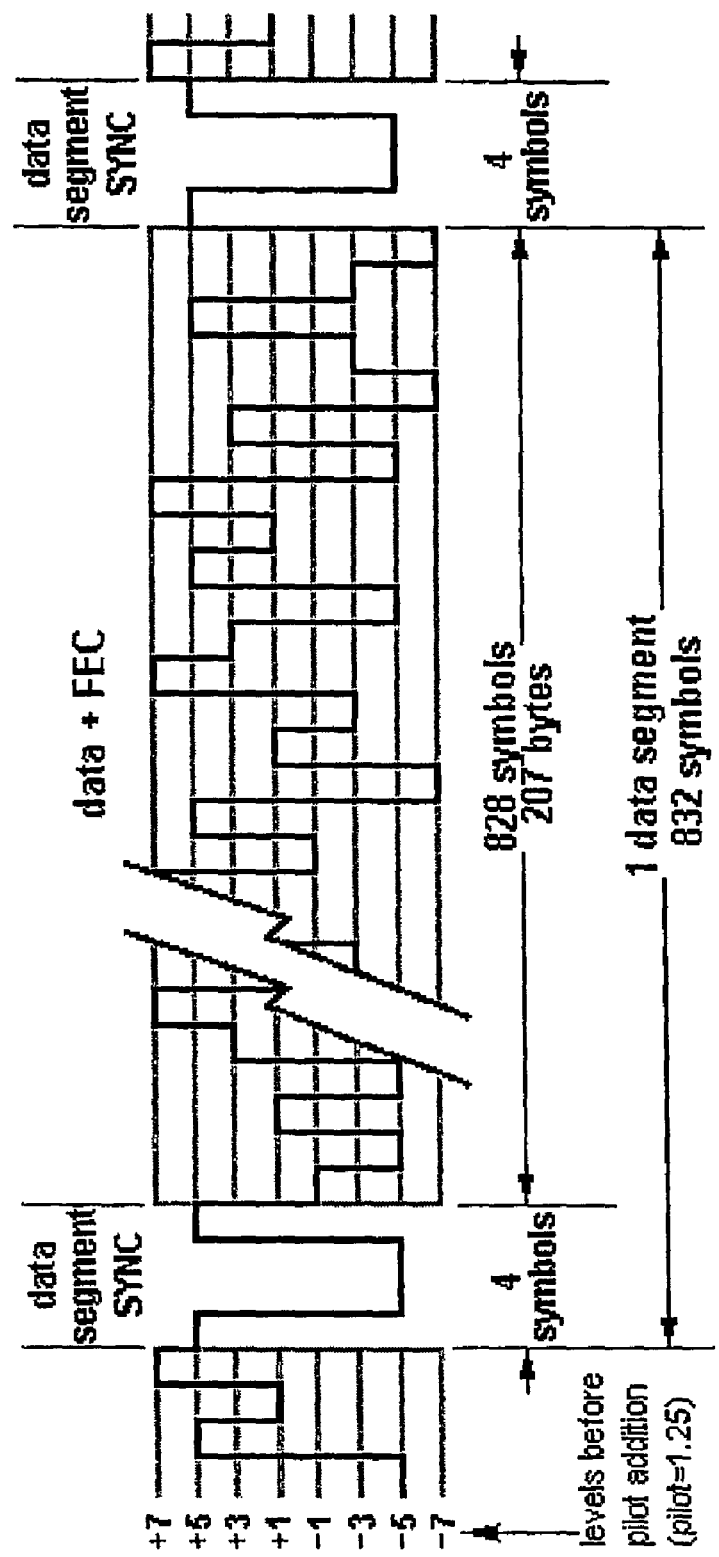
FIGS. 2 and 3 show a format for an ATSC DTV signal.
Figure 3:
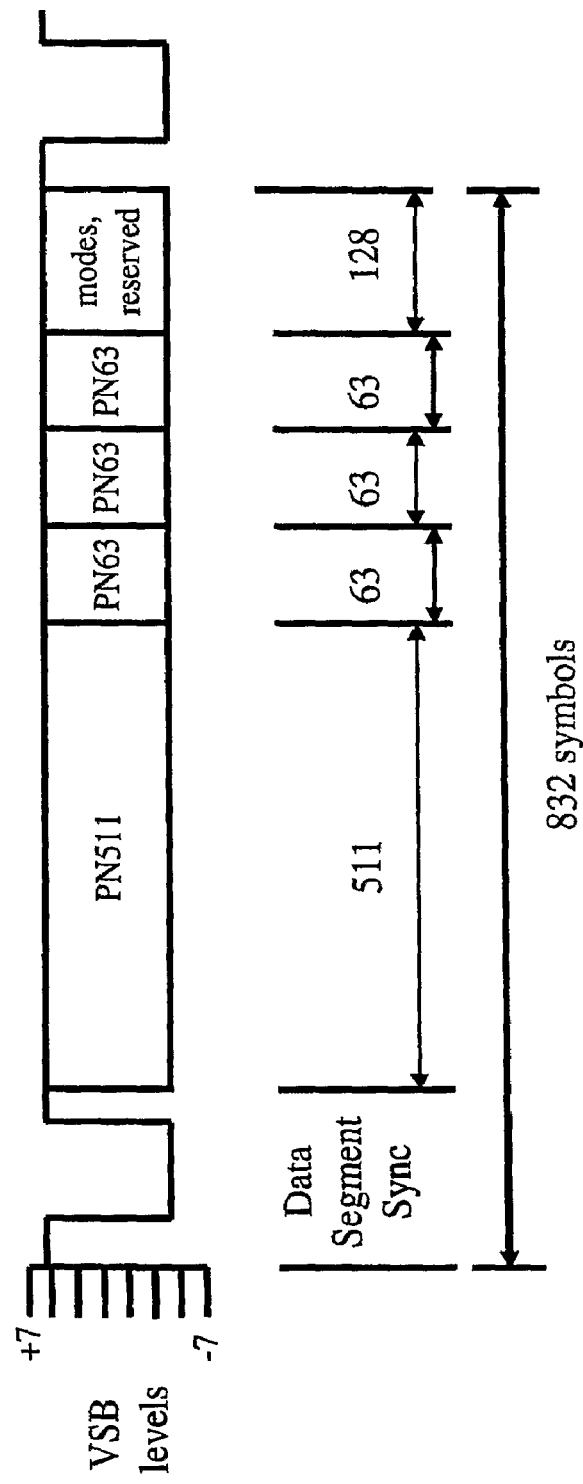

In this example, it is assumed that each TV channel is associated with a corresponding ATSC broadcast signal. The ATSC broadcast signal is also referred to herein as a digital TV (DTV) signal. The format of an ATSC signal is shown in FIGS. 2 and 3. DTV data is modulated using 8-VSB (vestigial sideband) and transmitted in data segments. An ATSC data segment is shown in FIG. 2. The ATSC data segment consists of 832 symbols: four symbols for data segment sync, and 828 data symbols. As can be observed from FIG. 2, the data segment sync is inserted at the beginning of each data segment and is a two-level (binary) four-symbol sequence representing the binary 1001 pattern, which corresponds to [5 −5 −5 5] in terms of 8-VSB symbol. Multiple data segments (313 segments) comprise an ATSC data field, which comprises a total of 260,416 symbols (832×313). The first data segment in a data field is called the field sync segment. The structure of the field sync segment is shown in FIG. 3, where each symbol represents one bit of data (two-level). In the field sync segment, a pseudo-random sequence of 511 bits (PN511) immediately follows the data segment sync. After the PN511 sequence, there are three identical pseudo-random sequences of 63 bits (PN63) concatenated together, with the second PN63 sequence being inverted every other data field.

Figure 4:
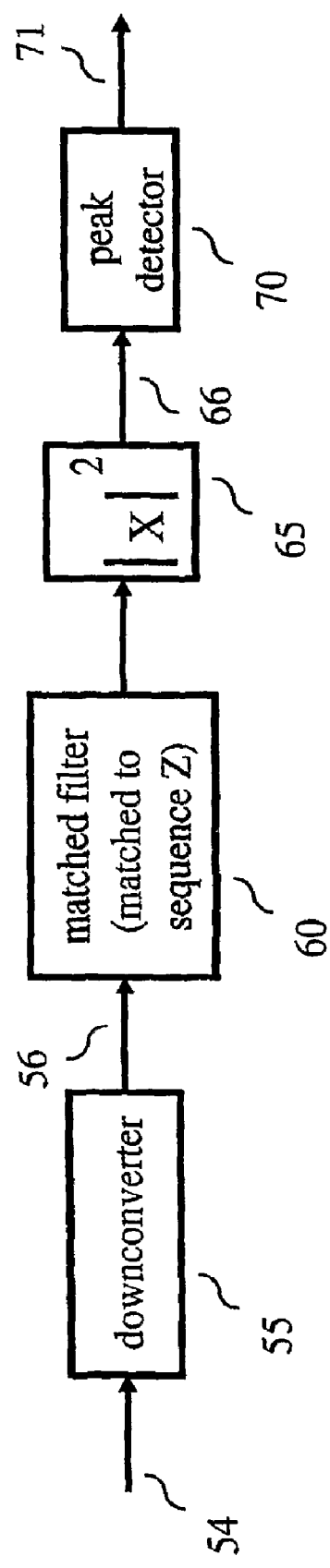
FIG. 4 shows a prior art ATSC field sync detector.

The data segment sync and field sync are representative of signature signals for an ATSC broadcast signal. For example, detection of the data segment sync pattern in a received signal can be used to identify the received signal as an ATSC broadcast signal. As such, in order to improve the accuracy of detecting ATSC broadcast signals in very low signal-to-noise ratio (SNR) environments, data segment sync symbols and field sync symbols embedded within an ATSC DTV signal are utilized to improve the detection probability, while reducing the false alarm probability. FIG. 4 shows a prior art field sync detector. The field sync detector of FIG. 4 comprises a downconverter 55, a matched filter 60, element 65 and peak detector 70. Downconverter 55 down converts a received signal 54 to baseband in the analog or digital domain (the signal exists as digital samples, for example, at the nominal symbol rate of 10.762 MHz or at two times the symbol rate). The resulting baseband signal, 56, is applied to matched filter 60. The latter is matched to a binary sequence, i.e., the above-mentioned PN511 or PN511 plus PN63 for identifying if the received signal is an ATSC broadcast signal. For example, denote Y0 as the four symbol segment sync sequence, Y1 as the PN511 sequence, Y2 as the PN63 sequence, and Y3 as a sequence with 63 zero valued symbols. Then, denote the sequence Z=[Y0, Y1, Y2, Y3, Y2] as representing the concatenation of these sequences. The reason that Y3 (all zero sequence) is used is because the middle PN63 sequence is inverted every other field. Obviously, other forms of sequence Z can also be used to detect an ATSC DTV signal, such as Z=[Y0, Y1], Z=[Y0, Y1, Y2] or Z=[Y0, Y1, Y3, Y3, Y2], etc. Thus, the matched filer 60 is a filter matched to the binary sequence Z, i.e., the impulse response of the filter is [z(n), z(n−1), . . . , Z(1)] if Z is denoted as [z(1), z(2), . . . , z(n)]. It should be noted that if the sample rate is twice the symbol rate, the Z sequence will be modified as [z(1), 0, z(2), 0, z(3), . . . , 0, z(n)] where zero-valued symbols are inserted between the symbols in the Z sequence. Following the matched filter 60, the magnitude (65) of the signal is taken (or more easily, the magnitude squared is taken as $I^2+Q^2$, where I and Q are in-phase and quadrature components, respectively, of the signal out of the matched filter 60). This magnitude value (66) is applied to peak detector 70, which determines if an outstanding peak exists. If an outstanding peak exists, then it is assumed that an ATSC broadcast signal is present and peak detector 70 indicates the presence of an ATSC broadcast signal via signal 71.

However, we have observed that the performance of the above-described signal detector can be improved if the matched filter does not match to the baseband signature signal but, instead, matches to the modulated version of the signature signal. Therefore, and in accordance with the principles of the invention, an apparatus comprises a transceiver for communicating with a wireless network over one of a number of channels, and a detector that matches to a modulated version of a signature signal for detecting the presence of an incumbent signal on one of the channels.

Figure 5:
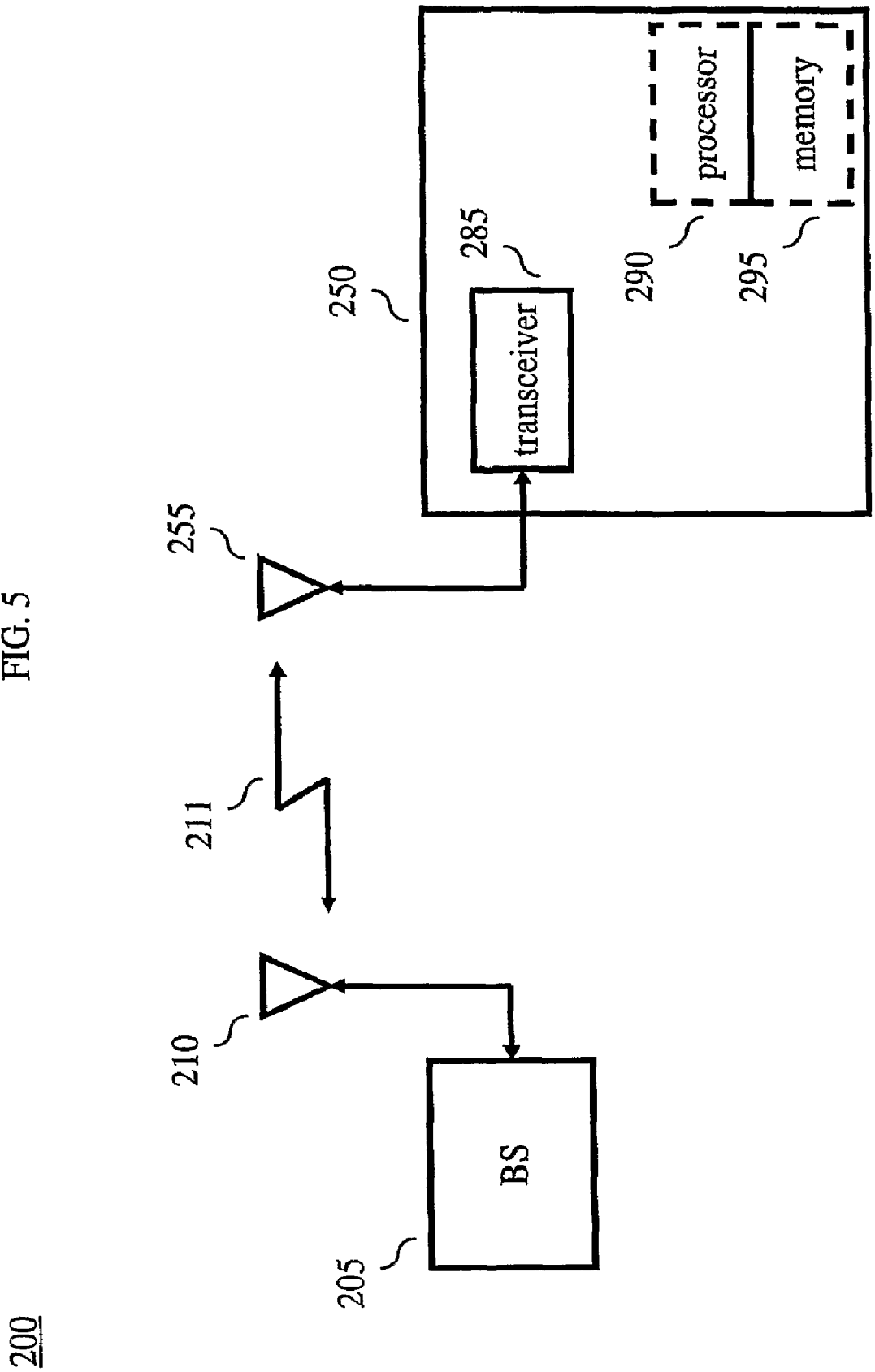
FIG. 5 shows an illustrative WRAN system in accordance with the principles of the invention.

An illustrative Wireless Regional Area Network (WRAN system 200 incorporating the principles of the invention is shown in FIG. 5. WRAN system 200 serves a geographical area (the WRAN area) (not shown in FIG. 5). In general terms, a WRAN system comprises at least one base station (BS) 205 that communicates with one, or more, customer premise equipment (CPE) 250. The latter may be stationary. Both CPE 250 and BS 205 are representative of wireless endpoints. CPE 250 is a processor-based system and includes one, or more, processors and associated memory as represented by processor 290 and memory 295 shown in the form of dashed boxes in FIG. 5. In this context, computer programs, or software, are stored in memory 295 for execution by processor 290. The latter is representative of one, or more, stored-program control processors and these do not have to be dedicated to the transceiver function, e.g., processor 290 may also control other functions of CPE 250. Memory 295 is representative of any storage device, e.g., random-access memory (RAM), read-only memory (ROM), etc.; may be internal and/or external to CPE 250; and is volatile and/or non-volatile as necessary. The physical layer of communication between BS 205 and CPE 250, via antennas 210 and 255, is illustratively OFDM-based via transceiver 285 and is represented by arrows 211. To enter a WRAN network, CPE 250 first attempts to "associate" with BS 205. During this attempt, CPE 250 transmits information, via transceiver 285, on the capability of CPE 250 to BS 205 via a control channel (not shown). The reported capability includes, e.g., minimum and maximum transmission power, and a supported, or available, channel list for transmission and receiving. In this regard, CPE 250 performs "channel sensing" in accordance with the principles of the invention to determine which TV channels are not active in the WRAN area. The resulting available channel list for use in WRAN communications is then provided to BS 205. The latter uses the above-described reported information to decide whether to allow CPE 250 to associate with BS 205.

Figure 6:
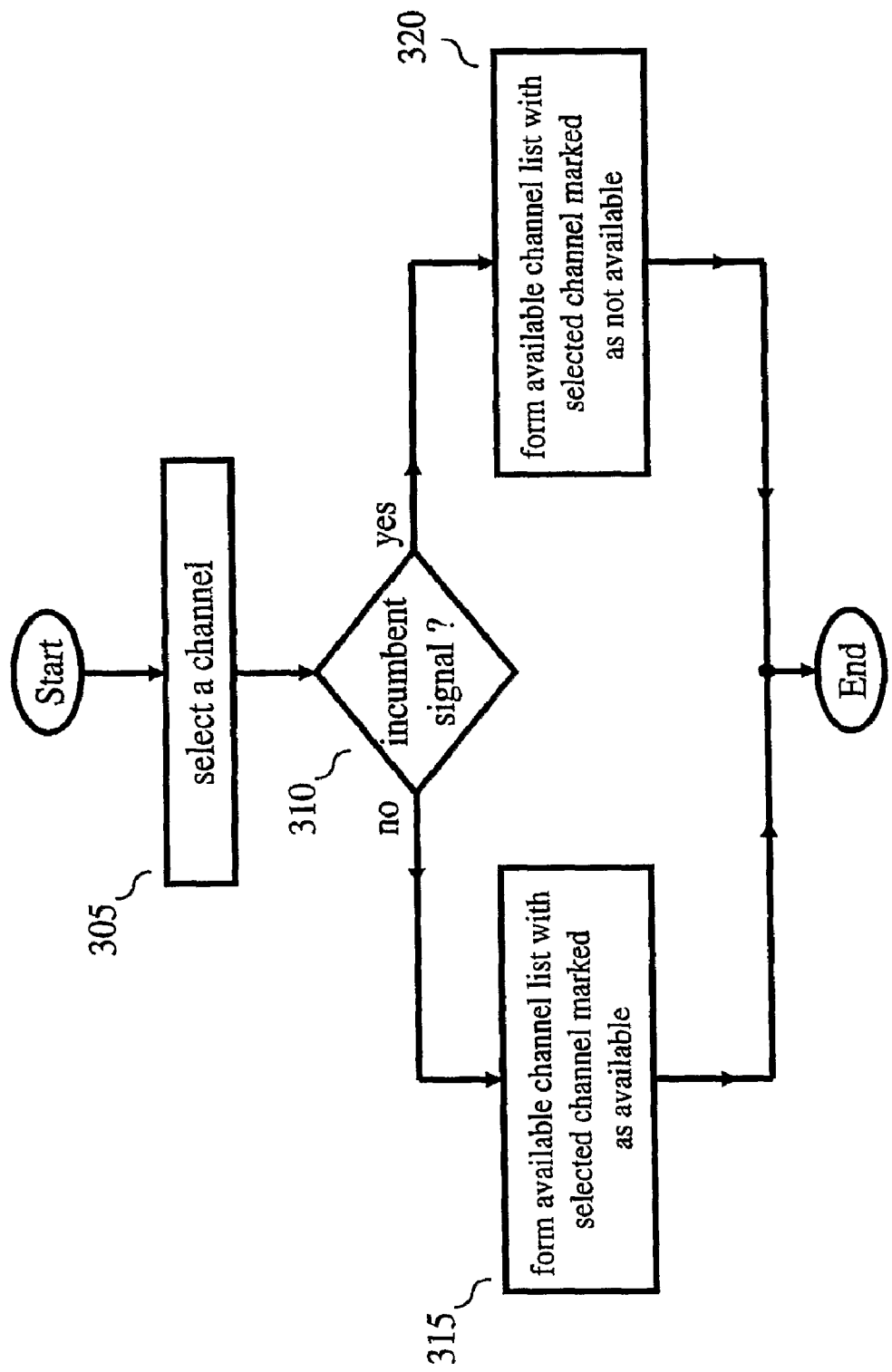
FIG. 6 shows an illustrative flow chart in accordance with the principles of the invention for use in the WRAN system of FIG. 5.

Turning now to FIG. 6, an illustrative flow chart for use in performing channel sensing in accordance with the principles of the invention is shown. The flow chart of FIG. 5 can be performed by CPE 250 over all of the channels, or only over those channels that CPE 250 has selected for possible use. Preferably, in order to detect incumbent signals in a channel, CPE 250 should cease transmission in that channel during the detection period. In this regard, BS 205 may schedule a quiet interval by sending a control message (not shown) to CPE 250. In step 305, CPE 250 selects a channel. In this example, the channel is assumed to be one of the TV channels shown in Table One of FIG. 1 but the inventive concept is not so limited and applies to other channels having other bandwidths. In step 310, CPE 250 scans the selected channel to check for the existence of an incumbent signal. In particular, CPE 250 filters a recovered baseband signal with a filter matched to a modulated version of a signature signal for use in determining if an incumbent signal exists on the selected channel (described further below). If no incumbent signal has been detected, then, in step 315, CPE 250 indicates the selected channel as available for use by the WRAN system on an available channel list (also referred to as a frequency usage map). However, if an incumbent signal is detected, then, in step 320, CPE 250 marks the selected channel as not available for use by the WRAN system. As used herein, a frequency usage map is simply a data structure stored in, e.g., memory 295 of FIG. 5, that identifies one, or more, channels, and parts thereof, as available or not for use in the WRAN system of FIG. 5. It should be noted that marking a channel as available or not can be done in any number of ways. For example, the available channel list may only list those channel that are available, thus effectively indicating other channels as not available. Similarly, the available channel list may only indicate those channels that are not available, thus effectively indicating other channels as available.

Figure 7:
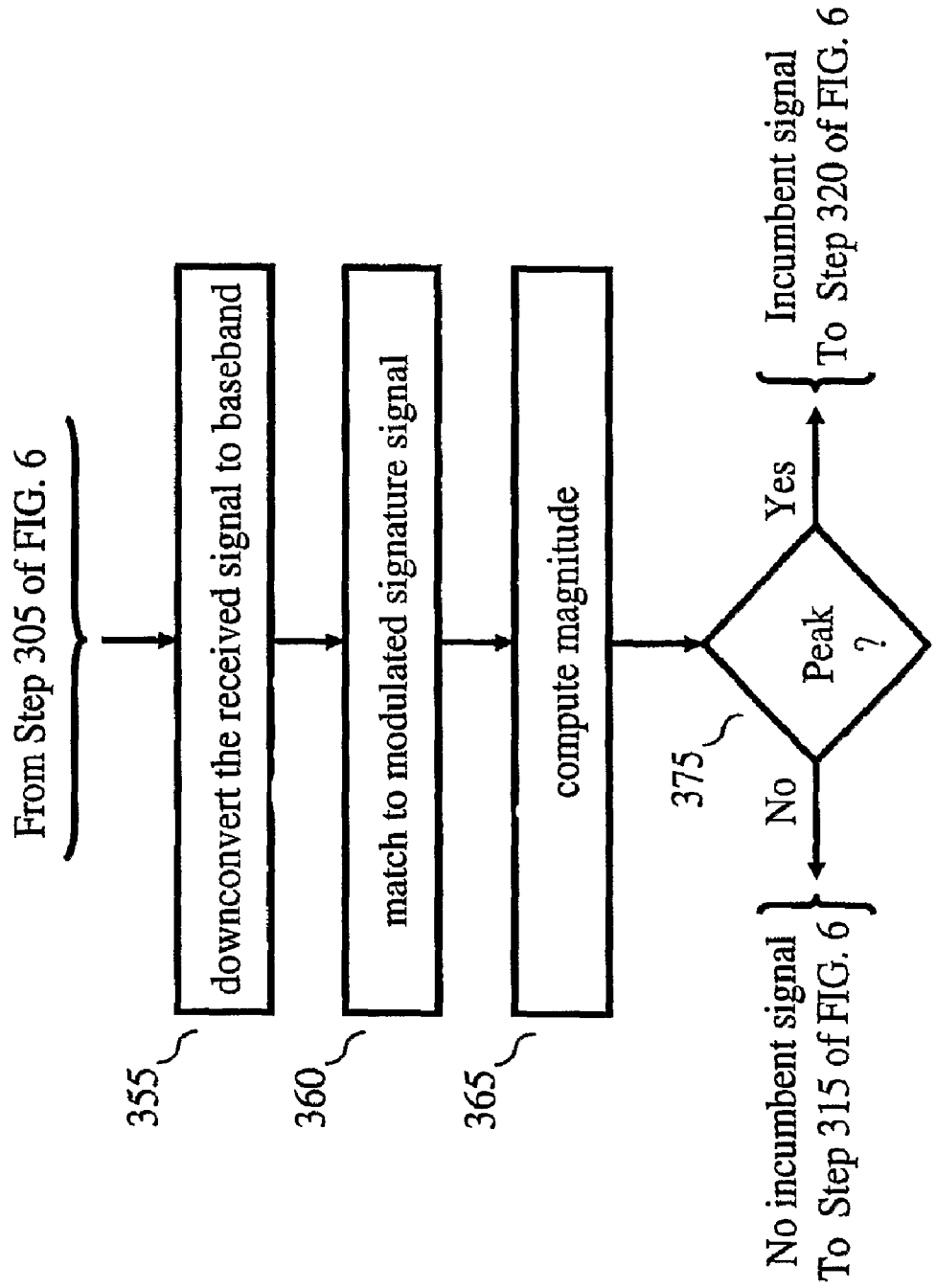
FIG. 7 shows another illustrative flow chart in accordance with the principles of the invention.

An illustrative flow chart for performing step 310 of FIG. 6 is shown in FIG. 7. In the flow chart of FIG. 7, CPE 250 looks for an ATSC field sync signal on the selected channel. In step 355, CPE 250 down converts a received signal to baseband in the digital domain. In step 360, CPE 250 filters the baseband signal with a filter matched to a modulated version of the ATSC field sync signal. In particular, CPE 250 matches the baseband signal to a sequence S that represents the modulated form of the ATSC field sync signal. The sequence S has the impulse response given as $[s^*(n), s^*(n-1), \ldots, s^*(1)]$ if the sequence S is represented as $[s(1), s(2), \ldots, s(n)]$. In step 365, CPE 250 computes the magnitude of the filtered signal. In step 375, CPE 250 looks for an outstanding peak from the computed magnitudes. If an outstanding peak exists, then it is assumed that an ATSC broadcast signal is present. However, if no outstanding peak exists, then it is assumed that an ATSC broadcast signal is not present.

Figure 8:
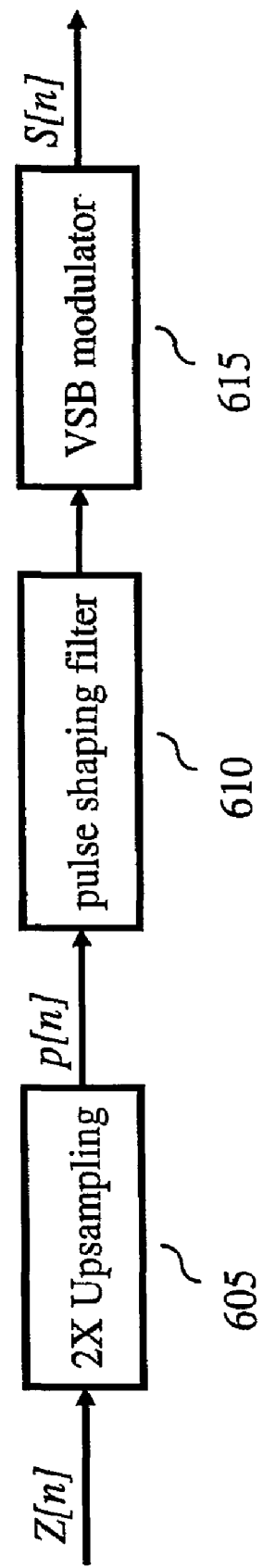
FIGS. 8 and 9 illustrate ways to determine a complex sequence for use in a matched filter in accordance with the principles of the invention.

Referring now to FIG. 8, an example of how to determine a modulated version of a signature signal is shown, illustratively for an ATSC signal. In the context of this example, modulation means "VSB modulation" that changes the binary reference sequence to a complex reference sequence. In this example, the complex reference sequence is still a baseband sequence, i.e., it is not modulated to passband, and the complex reference sequence matches the ATSC field sync in the baseband. The sequence $Z=[Y0, Y1, Y2, Y3, Y2]$ (described earlier above) is applied to 2x Upsampling element 605, which provides an upsampled signal p[n] to pulse shaping filter 610 before application to VSB modulator 615. The latter provides a complex sequence, S, which is a VSB modulated version of sequence Z. It should be noted that the 2x up-sampling element 605 simply inserts zeros in the input samples to form $[z(1), 0, z(2), 0, z(3), \ldots, 0, z(n)]$. Pulse shaping filter 610 is a root-raise cosine pulse shaping filter with roll-off factor 5.75%. VSB modulator 615 is a filter that removes that part of the spectrum of the signal in the negative frequency range to form a VSB signal according to the known ATSC VSB standard, e.g., see the ATSC standard describe earlier. Thus, and in accordance with the principles of the invention, a detector can use a filter matched to the sequence S that has the impulse response given as $[s^*(n), s^*(n-1), \ldots, s^*(1)]$ if the sequence S is represented as $[s(1), s(2), \ldots, s(n)]$. Obviously, other modulated forms of sequence Z can also be used to detect an ATSC DTV signal, such as $Z=[Y0, Y1]$, $Z=[Y0, Y1, Y2]$ or $Z=[Y0, Y1, Y3, Y3, Y2]$, etc., for forming the sequence S.

Figure 9:
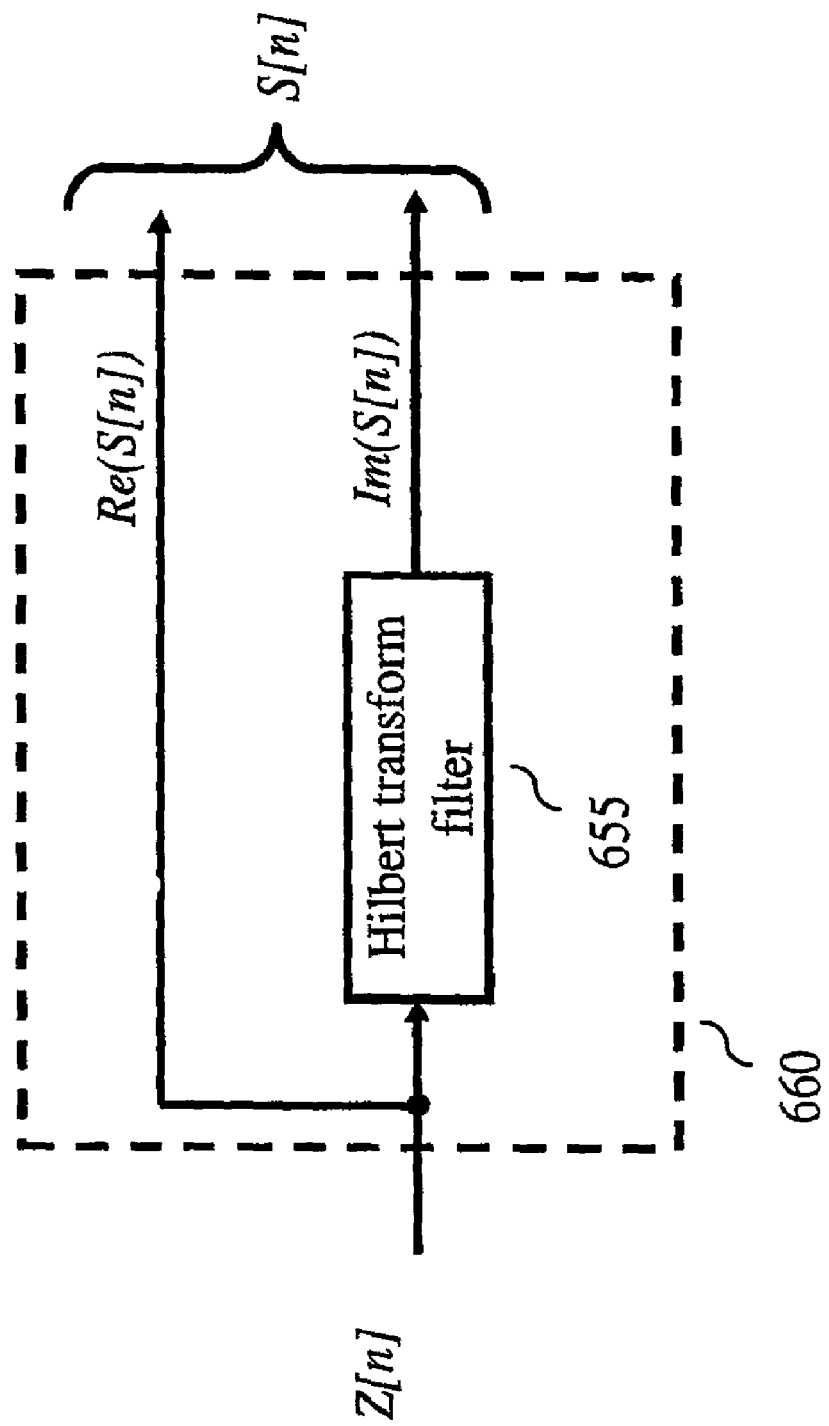

Although the inventive concept is described above using a sample rate that is twice the symbol rate, other sample rates can be used for determining the complex sequence. For example, if the sample rate is the symbol rate, then up-sampling element 605 and pulse shaping filter 610 are not needed. In this case, the real part of the sequence S is the sequence Z and the imaginary part of the sequence S can be generated by passing the sequence Z through a Hilbert transform filter. This is illustrated in FIG. 9. Filter 660 comprises Hilbert transform filter 655, which provides the imaginary part of the sequence S. In practice, the Hilbert transform filter 655 can be replaced by a filter with similar impulse response.

Figure 10:
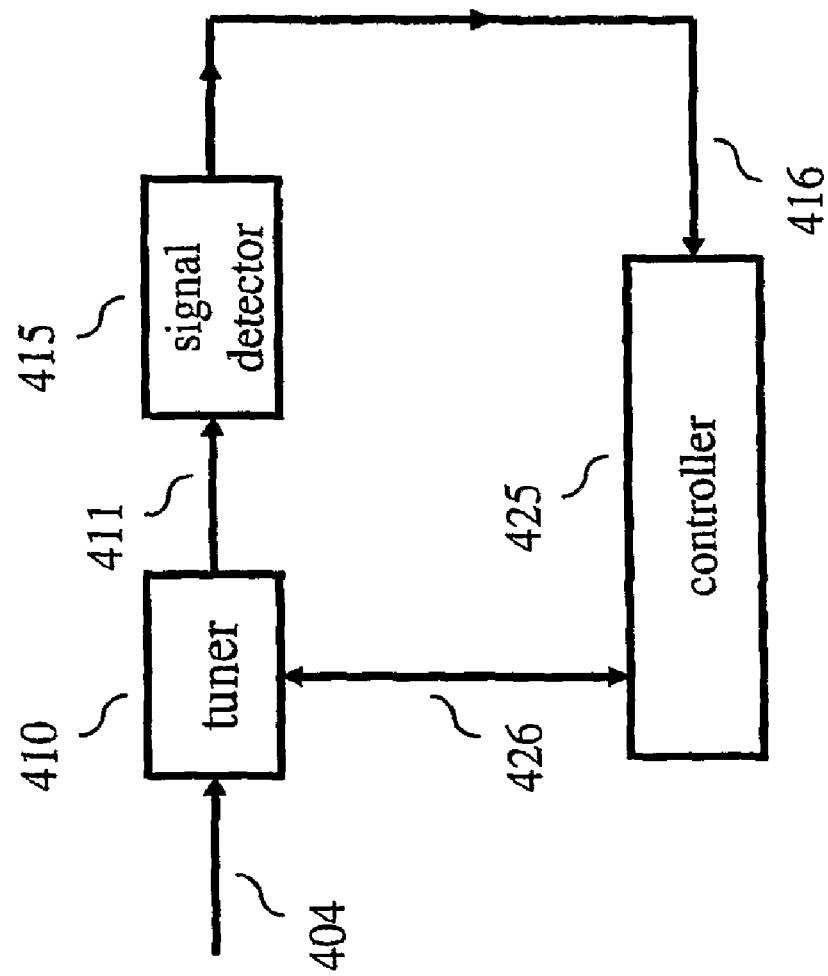
FIG. 10 shows an illustrative receiver for use in the WRAN system of FIG. 5 in accordance with the principles of the invention.

Turning briefly to FIG. 10, an illustrative portion of a receiver 405 for use in CPE 250 is shown (e.g., as a part of transceiver 285). Only that portion of receiver 405 relevant to the inventive concept is shown. Receiver 405 comprises tuner 410, signal detector 415 and controller 425. The latter is representative of one, or more, stored-program control processors, e.g., a microprocessor (such as processor 290), and these do not have to be dedicated to the inventive concept, e.g., controller 425 may also control other functions of receiver 405. In addition, receiver 405 includes memory (such as memory 295), e.g., random-access memory (RAM), read-only memory (ROM), etc.; and may be a part of, or separate from, controller 425. For simplicity, some elements are not shown in FIG. 10, such as an automatic gain control (AGC) element, an analog-to-digital converter (ADC) if the processing is in the digital domain, and additional filtering. Other than the inventive concept, these elements would be readily apparent to one skilled in the art. In this regard, the embodiments described herein may be implemented in the analog or digital domains. Further, those skilled in the art would recognize that some of the processing may involve complex signal paths as necessary.

In the context of the above-described flow charts, tuner 410 is tuned to different ones of the channels by controller 425 via bidirectional signal path 426 to select particular TV channels. For each selected channel, an input signal 404 may be present. Input signal 404 may represent an incumbent signal such as a digital VSB modulated signal in accordance with the above-mentioned "ATSC Digital Television Standard". Tuner 410 provides a downconverted signal 411 to signal detector 415. In accordance with the principles of the invention, signal detector 415 comprises a matched filter that matches to a modulated version of an ATSC field sync signal for detecting the presence of an incumbent ATSC broadcast signal. Signal detector 415 provides the resulting information to controller 425 via path 416.

Figure 11:
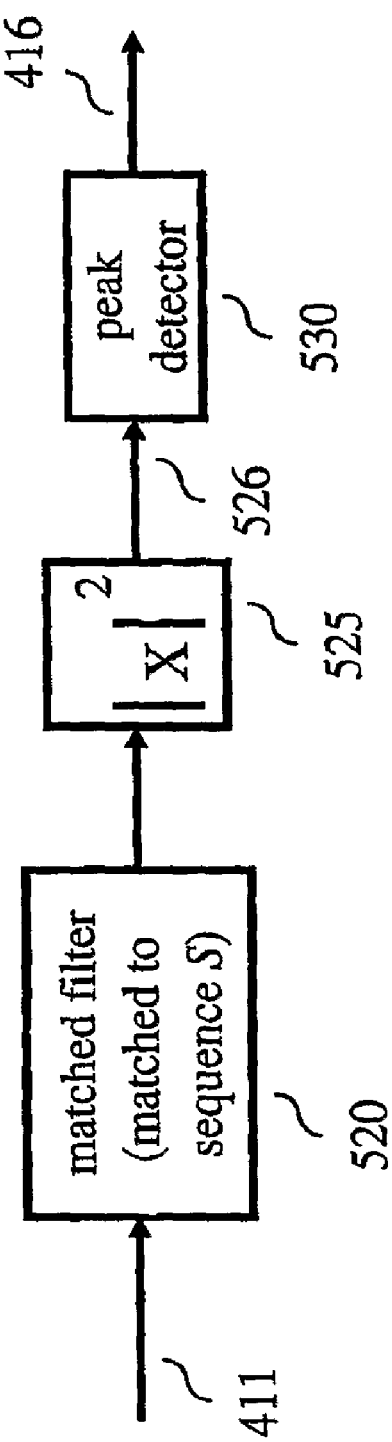
FIG. 11 shows an illustrative signal detector in accordance with the principles of the invention.

Referring now to FIG. 11, an illustrative embodiment of signal detector 415 is shown. The downconverted signal 411 is applied to matched filter 520. The latter is matched to the sequence S that has the impulse response given as [s*(n), s*(n−1), . . . , s*(1)] if the sequence S is represented as [s(1), s(2), . . . , s(n)]. Following the matched filter 520, the magnitude (525) of the signal is taken (or more easily, the magnitude squared is taken). This magnitude value (526) is applied to peak detector 530, which determines if an outstanding peak exists. If an outstanding peak exists, then it is assumed that an ATSC broadcast signal is present and peak detector 530 indicates the presence of an ATSC broadcast signal via signal 416. Obviously, and as noted earlier, other modulated forms of sequence Z can also be used to detect an ATSC DTV signal, such as Z=[Y0, Y1], Z=[Y0, Y1, Y2] or Z=[Y0, Y1, Y3, Y3, Y2], etc., for forming the sequence S.

As can be observed from the above, the inventive concept has been described in the context of looking for one of the signature signals (e.g., the ATSC data segment sync signal) present in an ATSC broadcast signal. However, the inventive concept is not so limited and can also be applied to detecting any signal that includes one, or more, signature signals. Further, the inventive concept can be combined with other techniques for detecting the presence of a signal, e.g., energy detection, etc. It should also be noted that although the inventive concept was described in the context of CPE 250 of FIG. 5, the invention is not so limited and also applies to, e.g., a receiver of BS 205 that may perform channel sensing. Further, the inventive concept is not restricted to a WRAN system and may be applied to any receiver that performs channel sensing.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements (e.g., of FIGS. 10 and 11) may be implemented in a stored-program-controlled processor, e.g., a digital signal processor, which executes associated software, e.g., corresponding to one, or more, of the steps shown in, e.g., FIGS. 6 and 7. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method for use in a wireless endpoint, the method comprising:
    tuning to one of a number of channels so as to provide a downconverted signal; and
    detecting the presence of an incumbent signal on the tuned channel including:
        filtering the downconverted signal by using a transfer function matched to a modulated version of a signature signal representative of the incumbent signal to provide a filtered signal; and
        determining if an incumbent signal is present as a function of the filtered signal.

2. The method of claim 1, wherein the determining step determines if an incumbent signal is present as a function of a peak value of the filtered signal.

3. The method of claim 1, wherein the modulated version of the signature signal is represented by a complex valued sequence, S.

4. The method of claim 1, wherein the signature signal is an Advanced Television Systems Committed (ATSC) field sync signal.

5. The method of claim 1, further comprising the step of:
    marking an available channel list to indicate that the tuned channel is available for use if no incumbent signal is present.

6. The method of claim 1, wherein the modulated version of the signature signal is a vestigial sideband (VSB) modulated version.

7. Apparatus comprising:
    a tuner for tuning to one of a number of channels so as to provide a downconverted signal; and
    a detector operative on the downconverted signal for detecting the presence of an incumbent signal on the tuned channel including a filter for filtering the downconverted signal for providing a filtered signal, wherein the filter is matched to a modulated version of a signature signal representative of the incumbent signal.

8. The apparatus of claim 7, wherein the detector determines if an incumbent signal is present as a function of a peak value of the filtered signal.

9. The apparatus of claim 7, wherein the modulated version of the signature signal is represented by a complex valued sequence, S.

10. The apparatus of claim 7, wherein the signature signal is an Advanced Television Systems Committed (ATSC) field sync signal.

11. The apparatus of claim 7, further comprising:
    a memory for storing an available channel list to indicate that the tuned channel is available for use if no incumbent signal is present.

12. The apparatus of claim 7, wherein the modulated version of the signature signal is a vestigial sideband (VSB) modulated version.

* * * * *